Figures 1, 2, 3:
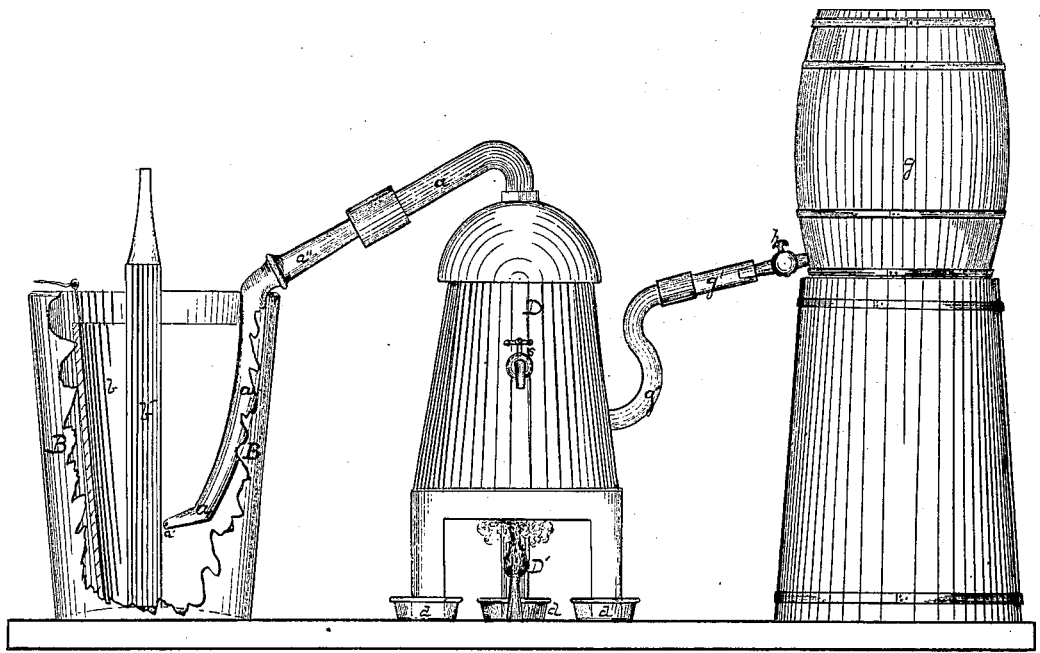

C. A. LINKE.
Improvement in Galvanic-Batteries.

No. 129,148. Patented July 16, 1872.

Witnesses.
R.P. Wrenshall
James I. Kay

Inventor.
Carl A. Linke,
by Bakewell, Christy & Kerr,
his Att'ys.

129,148

UNITED STATES PATENT OFFICE.

CARL A. LINKE, OF PITTSBURG, PENNSYLVANIA, ASSIGNOR TO HIMSELF, TRAUGOTT FRENZEL, AND HENRY W. OLIVER, JR., OF SAME PLACE.

IMPROVEMENT IN GALVANIC BATTERIES.

Specification forming part of Letters Patent No. 129,148, dated July 16, 1872.

SPECIFICATION.

*To all whom it may concern:*

Be it known that I, CARL A. LINKE, of Pittsburg, in the county of Allegheny and State of Pennsylvania, have invented a new and useful Improvement in Galvanic Battery; and I do hereby declare the following to be a full, clear, and exact description thereof, reference being had to the accompanying drawing making a part of this specification, in which—

Figure 1 represents a side elevation of my apparatus; and Figs. 2 and 3 are detached views of separate parts.

Like letters represent like parts in each.

My improvement consists in introducing a jet or jets of steam into the galvanic battery, and preferably under the surface of the fluid therein, for the purpose of increasing the power and efficiency of the battery.

To enable others skilled in the art to make and use my improvement, I will proceed to describe its construction and mode of operation.

B represents any of the ordinary or known forms of galvanic batteries, or a cell or cup of such a battery, in which are to be used two or more metallic plates, $b$, or one metallic plate, $b$, and a carbon plate or plates, $b'$, which plates are inserted into a fluid in the cup or cell, such fluid commonly consisting of sulphuric acid and water, with or without other ingredients. I have found that by introducing a jet or jets of steam into the battery, and preferably below the surface of the fluid and in close proximity to the plates $b$ or $b'$, the power of the battery is largely increased. For this purpose a steam jet-pipe, $a$, connected with any suitable steam-generator, D, leads into the cup, cell, or battery B, and, by one or more jet-holes, $a'$, discharges steam above or below the surface of the fluid therein, but preferably below. The jet-holes $a'$ are preferably so arranged that a jet of steam shall come in close proximity to each metal plate $b$ or each carbon plate $b'$, or both, and for this purpose the pipe $a$ may be bifurcated or divided into any desired number of branches, with one or more jet-holes to each branch. A part or the whole of the pipe $a$ should be of glass or other suitable non-conducting material, as at $a''$. Also, the furnace D', with the steam-generator D, should be insulated by glass plates $d$ or in other known manner. For supplying water to the steam-generator D, I have shown an elevated water-tank, $g$, with a supply-pipe, $g'$, preferably of glass or other non-conducting material, in whole or in part, leading thence and entering the steam-generator D below its water-line. This pipe $g'$ is fitted with the usual stop-cock $h$, and on the steam-generator D I place one or more gauge-cocks, $s$, for the usual purposes.

I have found by practical test that by the use of steam in the manner set forth the power of the battery may be considerably increased, especially when the jet-holes are arranged below the surface of the fluid.

What I claim as my invention, and desire to secure by Letters Patent, is—

1. Introducing a jet or jets of steam into the cup or cell of a galvanic battery, substantially as set forth.

2. In combination with a battery or cup or cell, B, a steam jet-pipe, $a$, leading from a steam-generator to the cell or cup of the battery, substantially as described.

3. The combination of battery B, steam-generator D, and water-tank $g$, connected and insulated, substantially as and for the purposes set forth.

In testimony whereof I, the said CARL A. LINKE, have hereunto set my hand.

CARL A. LINKE.

Witnesses:
   A. S. NICHOLSON,
   G. H. CHRISTY.